(12) United States Patent
Kimishima

(10) Patent No.: US 11,313,683 B2
(45) Date of Patent: Apr. 26, 2022

(54) INFORMATION PROCESSING DEVICE AND INFORMATION PROCESSING METHOD

(71) Applicant: SONY CORPORATION, Tokyo (JP)

(72) Inventor: Masato Kimishima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 321 days.

(21) Appl. No.: 16/314,938

(22) PCT Filed: May 23, 2017

(86) PCT No.: PCT/JP2017/019149
§ 371 (c)(1),
(2) Date: Jan. 3, 2019

(87) PCT Pub. No.: WO2018/012116
PCT Pub. Date: Jan. 18, 2018

(65) Prior Publication Data
US 2019/0310088 A1    Oct. 10, 2019

(30) Foreign Application Priority Data

Jul. 14, 2016 (JP) .............................. JP2016-139390

(51) Int. Cl.
*G01C 21/12* (2006.01)
*G01C 21/28* (2006.01)
*G01S 5/02* (2010.01)

(52) U.S. Cl.
CPC ............ *G01C 21/12* (2013.01); *G01C 21/28* (2013.01); *G01S 5/02* (2013.01)

(58) Field of Classification Search
CPC ........ G01C 21/12; G01C 21/28; G01C 21/16; G01S 5/02
See application file for complete search history.

(56) References Cited

U.S. PATENT DOCUMENTS

2012/0123735 A1* 5/2012 Kimishima .......... G01C 22/006
  702/160
2012/0136573 A1* 5/2012 Janardhanan .......... G01C 21/20
  701/512
(Continued)

FOREIGN PATENT DOCUMENTS

CN    103270427 A    8/2013
CN    103363990 A    10/2013
(Continued)

OTHER PUBLICATIONS

International Search Report and Written Opinion of PCT Application No. PCT/JP2017/019149, dated Aug. 29, 2017, 10 pages of ISRWO.

(Continued)

*Primary Examiner* — Regis J Betsch
*Assistant Examiner* — Jeremy A Delozier
(74) *Attorney, Agent, or Firm* — Chip Law Group

(57) ABSTRACT

There is provided an information processing device including a control unit that determines reliability of positioning information of a user calculated on a basis of sensed information output from a sensing unit built in a portable information processing device. According to the present disclosure, it is possible to determine the reliability of positioning information. Note that the effects described above are not necessarily limitative. With or in the place of the above effects, there may be achieved any one of the effects described in this specification or other effects that may be grasped from this specification.

19 Claims, 12 Drawing Sheets

(56) References Cited

U.S. PATENT DOCUMENTS

2012/0178470 A1    7/2012  Riley et al.
2013/0261959 A1   10/2013  Kimishima
2015/0301648 A1*  10/2015  Ogawa ................ G06F 3/04883
                                                              345/174

FOREIGN PATENT DOCUMENTS

| EP | 2656097 A1 | 10/2013 |
| JP | 2009-098099 A | 5/2009 |
| JP | 2009-276282 A | 11/2009 |
| JP | 2009-288022 A | 12/2009 |
| JP | 2012-208010 A | 10/2012 |
| JP | 2013-210299 A | 10/2013 |
| JP | 2013-234919 A | 11/2013 |
| JP | 2014-506324 A | 3/2014 |
| JP | 2016-042100 A | 3/2016 |
| KR | 10-2013-0116900 A | 10/2013 |
| WO | 2012/070595 A1 | 5/2012 |
| WO | 2012/088281 A1 | 6/2012 |

OTHER PUBLICATIONS

Office Action for JP Patent Application No. 2018-527422 dated Jun. 15, 2021, 06 pages of Office Action and 05 pages of English Translation.

Office Action for JP Patent Application No. 2018-527422 dated Dec. 1, 2020, 06 pages of Office Action and 06 pages of English Translation.

Office Action for JP Patent Application No. 2018527422, dated Dec. 21, 2021, 02 pages of English Translation and 02 pages of Office Action.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/019149 filed on May 23, 2017, which claims priority benefit of Japanese Patent Application No. JP 2016-139390 filed in the Japan Patent Office on Jul. 14, 2016. Each of the above-referenced applications is hereby incorporated herein by reference in its entirety.

TECHNICAL FIELD

The present disclosure relates to an information processing device, an information processing method, and a program.

BACKGROUND ART

As disclosed in Patent Literature 1, for example, Pedestrian Dead Reckoning (PDR) through use of a portable information processing device is known. In this technology, an estimated traveling orientation of a user is calculated on the basis of sensed information output from a built-in sensor of the portable information processing device.

CITATION LIST

Patent Literature

Patent Literature 1: JP 2013-234919A

DISCLOSURE OF INVENTION

Technical Problem

In the meanwhile, in the case where a displacement occurs between an estimated traveling orientation and an actual traveling orientation (that is, in the case where the reliability of the estimated traveling orientation has decreased), the user may have an uncomfortable feeling about the estimated traveling orientation. However, a technology of determining the reliability of positioning information such as an estimated traveling orientation has not been proposed at all.

Thus, the present disclosure provides an information processing device, an information processing method, and a program that can determine the reliability of positioning information.

Solution to Problem

According to the present disclosure, there is provided an information processing device including: a control unit configured to determine reliability of positioning information of a user calculated on a basis of sensed information output from a sensing unit built in a portable information processing device.

According to the present disclosure, there is provided an information processing method including: determining, by a processor, reliability of positioning information of a user calculated on a basis of sensed information output from a sensing unit built in a portable information processing device.

According to the present disclosure, there is provided a program causing a computer to achieve: a control function of determining reliability of positioning information of a user calculated on a basis of sensed information output from a sensing unit built in a portable information processing device.

Advantageous Effects of Invention

According to the present disclosure as described above, it is possible to determine the reliability of an estimated traveling orientation. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
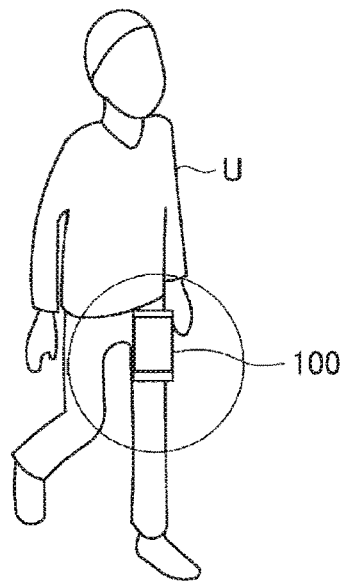
FIG. 1 is an explanatory diagram describing an example of a use mode of a portable information processing device.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Overview of PDR through use of portable information processing device
2. Factors for decrease in reliability of PDR
3. Configuration of portable information processing device
4. Exemplary processing performed by portable information processing device
4-1. Exemplary processing 1
4-2. Exemplary processing 2
4-3. Exemplary processing 3
4-4. Exemplary processing 4
<1. Overview of PDR>

The present inventor has made intense studies about PDR through use of a portable information processing device, and as a result, has reached a technology according to the present embodiment. Thus, an overview of PDR through use of a portable information processing device will be described first.

In PDR through use of a portable information processing device, an estimated traveling orientation of a user is calculated on the basis of sensed information output from a built-in sensor of the portable information processing device. Here, the built-in sensor is an acceleration sensor, a gyro sensor, a geomagnetic sensor, or the like, for example. PDR is used in some cases at a place (for example, indoors) where a positioning method (for example, a global positioning system (GPS)) by which the absolute position of the user can be measured cannot be used, for example.

Specifically, an initial value of the orientation (a so-called initial orientation) of the portable information processing device is first specified. Here, the orientation of the portable information processing device is a so-called yaw orientation (orientation within a horizontal plane). The initial orientation of the portable information processing device is, for example, a traveling orientation of the user measured by GPS immediately before starting positioning by PDR. That is, a yaw orientation measured by a measuring method by which the absolute orientation of the user can be measured is determined as the initial orientation. A yaw orientation specified by sensed information of the geomagnetic sensor is determined as the initial orientation in some cases. In addition, a yaw orientation previously set is determined as the initial orientation in some cases. Note that the yaw orientation of the portable information processing device cannot be calculated merely from sensed information output from the acceleration sensor and the gyro sensor.

Then, on the basis of sensed information output from the built-in sensor (for example, the gyro sensor), the amount of variations in the yaw orientation is calculated. Accordingly, the current yaw orientation of the portable information processing device is specified. Then, the orientation of the portable information processing device is determined as the estimated traveling orientation of the user.

In this manner, in PDR through use of a portable information processing device, the orientation of the portable information processing device is sequentially updated on the basis of sensed information output from the built-in sensor of the portable information processing device. Then, the orientation of the portable information processing device is regarded as the estimated traveling orientation of the user. Then, in PDR, the current position (that is, the amount of movement from the starting time of PDR positioning) and the speed of the user are estimated on the basis of the estimated traveling orientation of the user, a stride and a walking pitch of the user, and the like. Note that the estimated traveling orientation, position, and speed of the user measured by PDR or another positioning method will also be referred to as "positioning information" collectively.

<2. Factors for Decrease in Reliability of PDR>

In this manner, PDR presupposes that the orientation of the portable information processing device agrees with the actual traveling orientation of the user. In the case where the user and the portable information processing device move together, such as in the case where the portable information processing device is in close contact with the user's body, the both substantially agree in many cases. Consequently, the traveling orientation of the user can be detected with high accuracy. That is, the reliability of the estimated traveling orientation is high. However, in the case where a displacement occurs between the orientation of the portable information processing device and the actual traveling orientation of the user, the reliability of the estimated traveling direction decreases.

Figure 2:
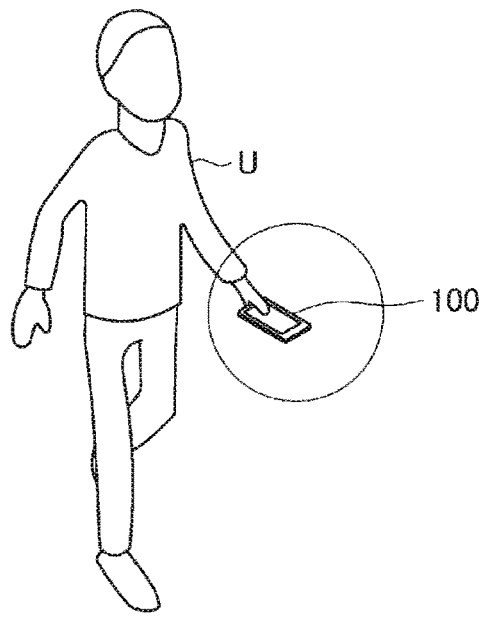
FIG. 2 is an explanatory diagram describing an example of a use mode of a portable information processing device.

Thus, the present inventor has made intense studies about factors for a decrease in reliability of the estimated traveling direction. As a result, the present inventor has found out some factors. A first factor is shifting of a portable information processing device 100 performed by the user as illustrated in FIG. 1 and FIG. 2. A person U in FIG. 1 is the user of the portable information processing device 100. The same applies to the other drawings. In the example of FIG. 1 and FIG. 2, the user takes out the portable information processing device 100 from a pocket and shifts the portable information processing device 100 to the hand. As a result, the attitude of the portable information processing device 100 varies, and the orientation also varies. However, the traveling orientation of the user hardly varies. As a result, a displacement occurs between the orientation of the portable information processing device, that is, the estimated traveling orientation of the user and the actual traveling orientation of the user.

Figure 3:
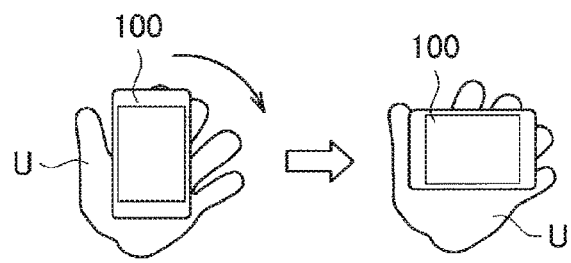
FIG. 3 is an explanatory diagram describing an example of a use mode of a portable information processing device.
Figure 4:
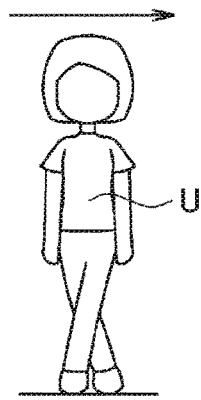
FIG. 4 is an explanatory diagram describing an example of a use mode of a portable information processing device.
Figure 5:
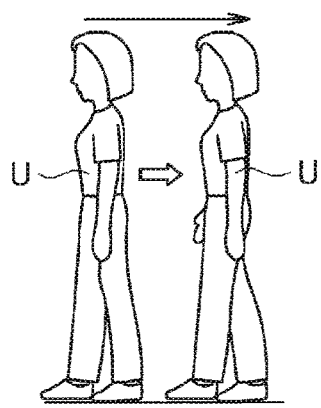
FIG. 5 is an explanatory diagram describing an example of a use mode of a portable information processing device.

A second factor is a rotation of the portable information processing device 100 within the horizontal plane, as illustrated in FIG. 3. The orientation of the portable information processing device 100 varies also in the case where such an operation is performed, whilst the actual traveling orientation of the user hardly varies. A third factor is the case where the user has started a lateral movement (for example, lateral walking), as illustrated in FIG. 4. In this case, the orientation of the portable information processing device 100 does not vary, whilst the traveling orientation of the user varies. A fourth factor is the case where the user has started a backward movement (for example, backward walking), as illustrated in FIG. 5. In this case, the orientation of the portable information processing device 100 does not vary, whilst the traveling orientation of the user varies. In this manner, the reliability of the estimated traveling direction decreases according to various factors, whilst a technology for determining the reliability has not been proposed at any. The present inventor has reached the technology according to the present embodiment by making intense studies about the above-described factors and the like.

<3. Configuration of Portable Information Processing Device>

Figure 6:
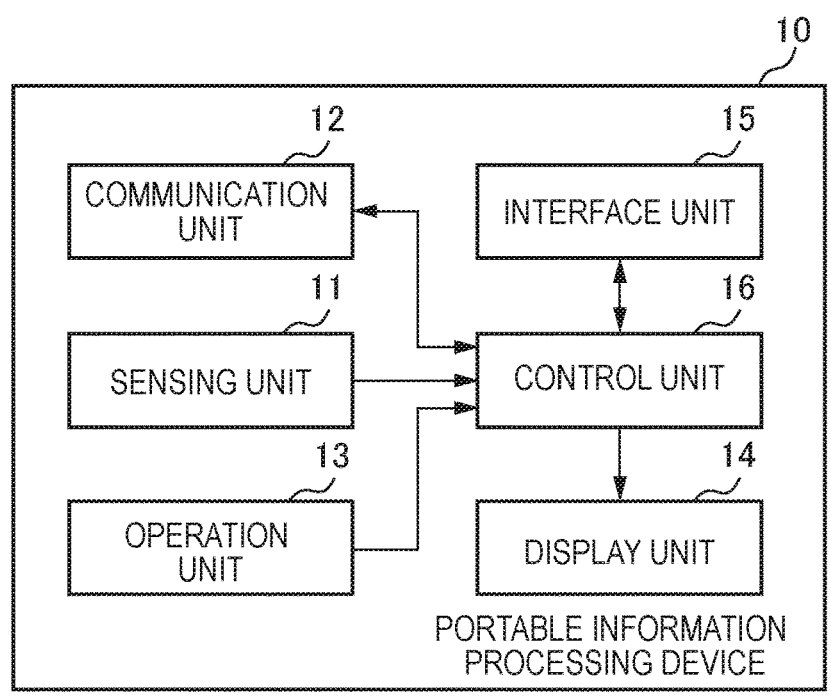
FIG. 6 is a block diagram showing an inner configuration example of the portable information processing device according to the present disclosure.

Next, a schematic configuration of a portable information processing device 10 according to the present embodiment will be described on the basis of FIG. 6 and FIG. 7. As shown in FIG. 6, the portable information processing device 10 includes a sensing unit 11, a communication unit 12, an operation unit 13, a display unit 14, an interface unit 15, and a control unit 16. Note that the portable information processing device 10 may be any information processing device that can be carried by the user and has functions which will be described later. Examples of the portable information processing device 10 can include a smartphone, tablet, mobile phone, and the like.

Figure 7:
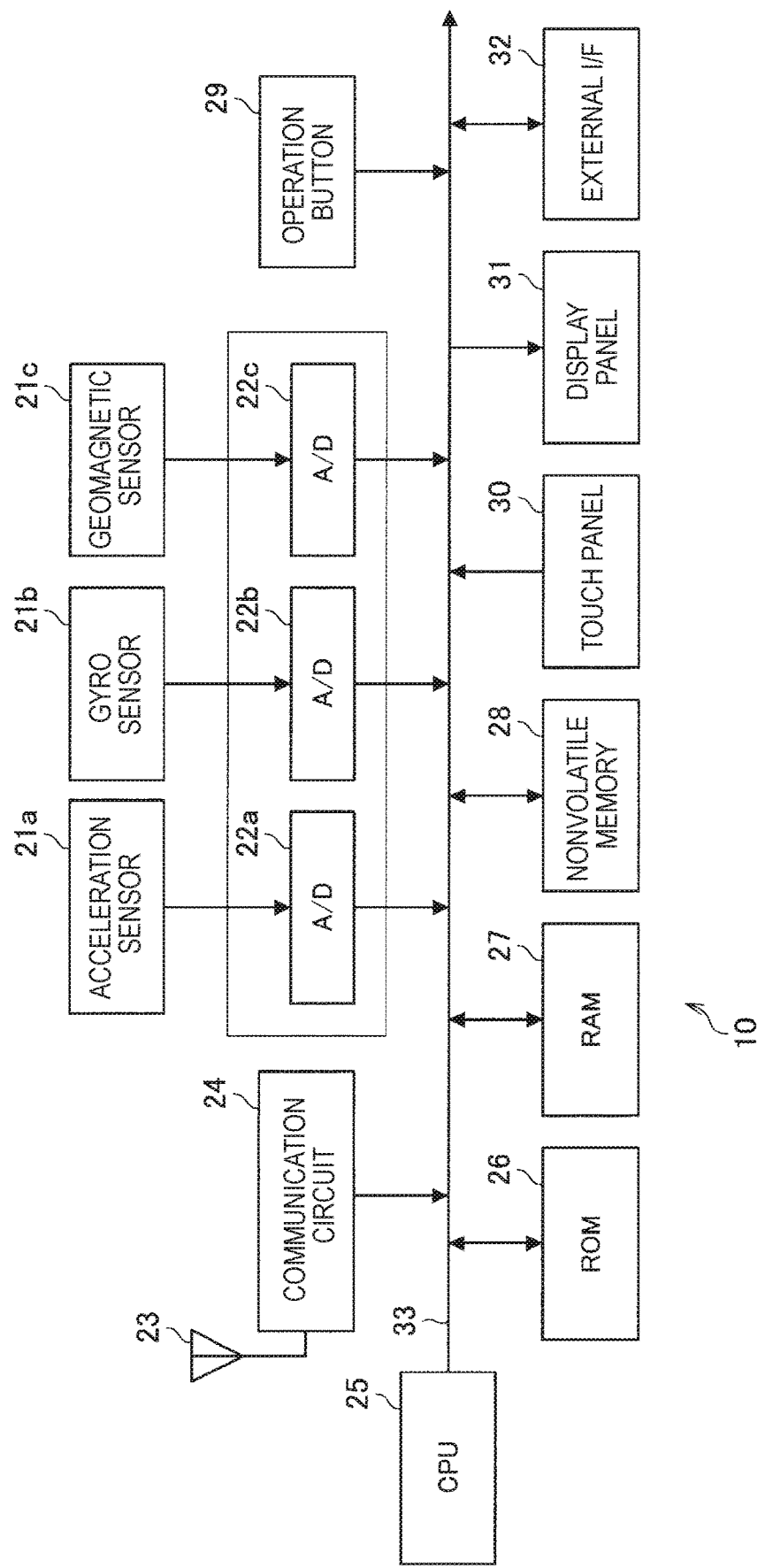
FIG. 7 is a block diagram showing a hardware configuration example of the portable information processing device.

The sensing unit 11 includes an acceleration sensor 21a, a gyro sensor 21b, a geomagnetic sensor 21c, and the like shown in FIG. 7, for example. Here, the built-in sensor included in the sensing unit 11 is not limited to these sensors, but may be any sensor that can output sensed information for specifying the attitude of the portable information processing device 10. In addition, any of the acceleration sensor 21a, the gyro sensor 21b, and the geomagnetic sensor 21c may be omitted. However, it is preferable that the portable information processing device 10 at least has the acceleration sensor 21a. The sensing unit 11 outputs various types of sensed information to the control unit 16. For example, the acceleration sensor 21a outputs acceleration information to the control unit 16. The gyro sensor 21b outputs gyro information (that is, angular velocity information) to the control unit 16. The geomagnetic sensor 21c outputs geomagnetic information to the control unit 16.

The communication unit 12 includes a communication antenna 23 and a communication circuit 24 shown in FIG. 7, for example. The communication unit 12 transmits/receives various types of communication information. For example, the communication unit 12 receives GPS information. The communication unit 12 outputs the received communication information to the control unit 16. The communication circuit 24 includes a telephone communication circuit, a communication circuit for Wifi, a communication circuit for GPS, and the like, for example, but is not limited to these examples.

The operation unit 13 includes an operation button 29, a touch panel 30, and the like shown in FIG. 7, for example. The operation unit 13 accepts an input of operation information made by the user. Then, the operation unit 13 outputs the input operation information to the control unit 16.

The display unit 14 includes a display panel 31 shown in FIG. 7, for example. The display unit 14 displays various images (for example, positioning information and the like).

The interface unit 15 includes an external interface circuit 32 and the like shown in FIG. 7, for example. The interface unit 15 is a connecting portion for connecting the portable information processing device 10 to another information processing device and the like.

The control unit 16 includes a central processing unit (CPU) 25, a read only memory (ROM) 26, a random access memory (RAM) 27, a nonvolatile memory 28, and the like shown in FIG. 7, for example. The control unit 16 performs the following processing, for example, besides controlling structural elements of the portable information processing device 10. Specifically, the control unit 16 calculates the estimated traveling orientation of the user on the basis of sensed information. Further, the control unit 16 calculates the position and speed of the user on the basis of the estimated traveling orientation, stride, and walking pitch of the user. That is, the control unit 16 generates positioning information using PDR.

Further, the control unit 16 evaluates the reliability of the estimated traveling orientation calculated using PDR. Then, in the case where the reliability has decreased, the control unit 16 performs processing such as generating positioning information using another positioning method or displaying that the reliability has decreased to the user. Details of these types of processing will be described later. The control unit 16 may determine the reliability of another type of positioning information. Here, examples of another type of positioning information can include speed, position, and the like. That is, at least one kind among the estimated traveling orientation, speed, and position may be included in positioning information to be targeted for the determination made by the control unit 16. Then, in the case where the reliability of the estimated traveling orientation is low, the control unit 16 may determine that the reliability of speed and position also decreases. In addition, the control unit 16 may display these types of positioning information in a display mode in accordance with the reliability.

Here, a hardware configuration of the portable information processing device 10 will be described. The portable information processing device 10 includes the acceleration sensor 21a, the gyro sensor 21b, the geomagnetic sensor 21c, A/D converters 22a to 22c, the communication antenna 23, and the communication circuit 24, as shown in FIG. 7. Further, the portable information processing device 10 includes the CPU 25, the ROM 26, the RAM 27, the nonvolatile memory 28, the operation button 29, the touch panel 30, the display panel 31, the external interface circuit 32, and a bus 33.

The acceleration sensor 21a, the gyro sensor 21b, and the geomagnetic sensor 21c are examples of the built-in sensor of the portable information processing device 10. The acceleration sensor 21a senses the acceleration of the portable information processing device 10, and outputs acceleration information. The gyro sensor 21b senses the angular velocity of the portable information processing device 10, and outputs gyro information. The geomagnetic sensor 21c senses the geomagnetic field acting on the portable information processing device 10, and outputs geomagnetic information. The A/D converters 22a to 22c perform A/D conversion on the information output from each built-in sensor described above, that is, sensed information, for output to the CPU 25 or the like. The communication circuit 24 outputs various types of communication information received from the communication antenna 23 to the CPU 25 or the like. In addition, communication information supplied from the CPU 25 or the like is transmitted from the communication antenna 23 to another information processing device. The CPU 25 reads and executes a program stored in the ROM 26. Consequently, the CPU 25 (that is, a processor) functions as an operating subject of the portable information processing device 10. The ROM 26 stores a program necessary for the operation of the portable information processing device 10 and the like. The RAM 27 is used as a working area by the CPU 25 and the like. Various types of information are stored in the nonvolatile memory 28. The operation button 29 and the touch panel 30 accept operation information input by the user. The display panel 31 displays various images. The external interface circuit 32 is a connecting portion for connecting the portable information processing device 10 to another information processing device and the like. The bus 33 connects respective hardware components to one another.

<4. Exemplary Processing Performed by Portable Information Processing Device>

(4-1. Exemplary Processing 1)

Next, exemplary processing 1 performed by the portable information processing device 10 will be described on the basis of FIG. 8 to FIG. 9. In this exemplary processing 1, the portable information processing device 10 performs positioning by PDR, and on the other hand, determines the reliability of the estimated traveling orientation obtained by PDR on the basis of an attitude change of the portable information processing device 10. In the case where the user uses the portable information processing device 10 in a use mode (shifting of the portable information processing device 10) shown in FIG. 1 and FIG. 2, for example, the attitude of the portable information processing device 10 changes. Accordingly, a displacement may occur between the orientation of the portable information processing device 10 and the actual traveling orientation of the user. Consequently, according to the exemplary processing 1, a decrease in reliability of the estimated traveling orientation can be detected in the case where there is a change in use mode as shown in FIG. 1 and FIG. 2.

Figure 8:
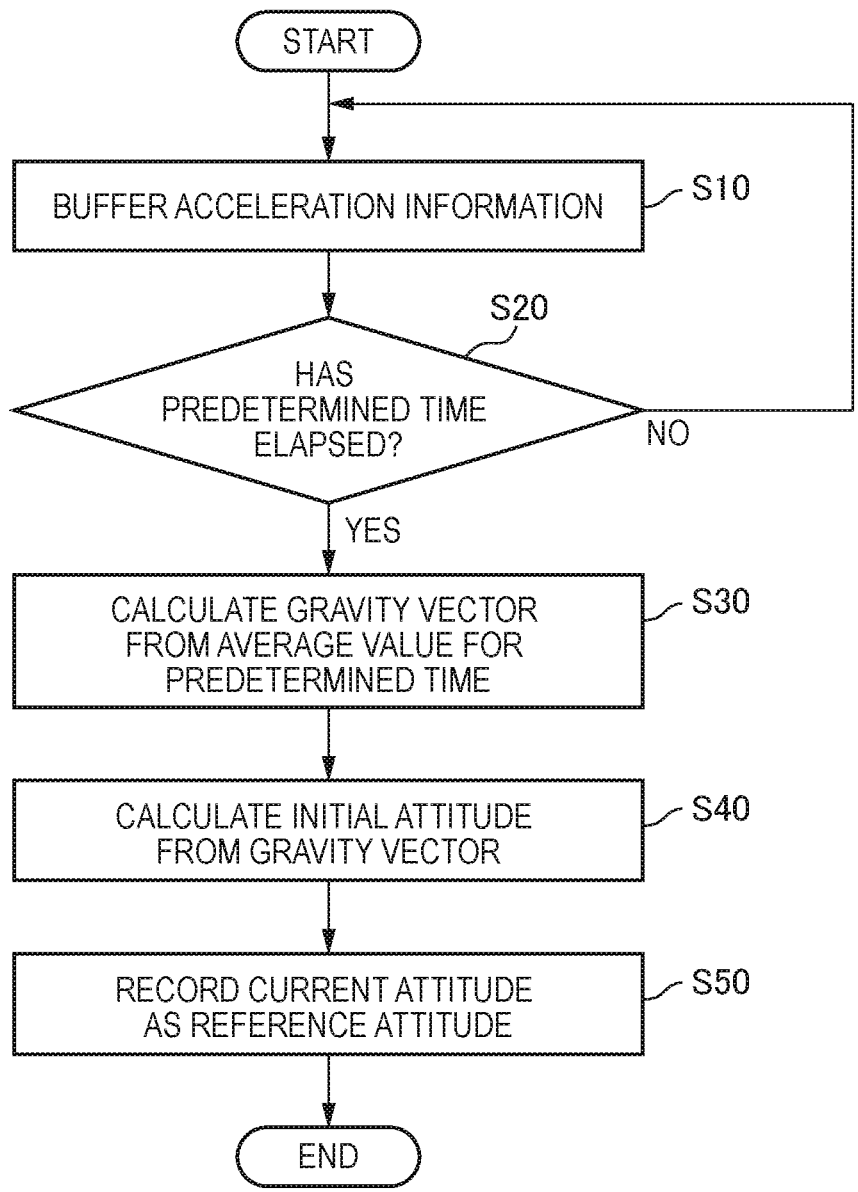
FIG. 8 is a flowchart showing an example of processing performed by the portable information processing device.

The portable information processing device 10 first performs initial attitude determination processing shown in FIG. 8 to calculate an initial attitude of the portable information processing device 10. Specifically, in step S10, the control unit 16 buffers acceleration information supplied from the sensing unit 11.

In step S20, the control unit 16 determines whether or not an elapsed time since buffering of the acceleration information is started has become more than or equal to a predetermined time. In the case where it is determined that the elapsed time has become more than or equal to the predetermined time, the control unit 16 proceeds to step S30, and in the case where it is determined that the elapsed time is less than the predetermined time, returns to step S10. Here, the predetermined time is not particularly restricted, but may be four to six seconds, for example, and may be approximately five seconds.

In step S30, the control unit 16 calculates an average value of acceleration information buffered for the predetermined time. Here, the average value may be a so-called arithmetic mean value, or may be a value obtained via a low-pass filter. Then, the control unit 16 calculates a gravity vector on the basis of the average value of acceleration information. Here, a coordinate system of the gravity vector is a so-called local coordinate system.

In step S40, the control unit 16 calculates the initial attitude of the portable information processing device 10 on the basis of the gravity vector. Specifically, the control unit 16 calculates a pitch angle and a roll angle of the portable information processing device 10 on the basis of the gravity vector and a rotation matrix that makes a conversion from the local coordinate system to a global coordinate system. This rotation matrix is also referred to as a discrete cosine matrix (DCM).

Further, the control unit 16 calculates a yaw orientation (yaw orientation angle) of the portable information processing device 10. However, the yaw orientation cannot be obtained from the gravity vector. Thus, the control unit 16 determines the traveling orientation of the user measured using GPS or Wifi immediately before starting the initial attitude determination processing (that is, starting positioning by PDR), for example, as the yaw orientation. That is, a yaw orientation measured by a measuring method by which the absolute orientation of the user can be measured is determined as the initial orientation. A yaw orientation specified by sensed information of the geomagnetic sensor may be determined as the initial orientation. In addition, a previously set yaw orientation may be determined as the initial orientation. Note that a positioning method through use of GPS or Wifi causes a large error for a short period as compared with PDR, but accumulation, divergence, and the like of errors are unlikely to occur.

Then, the control unit 16 defines the yaw orientation, pitch angle, and roll angle of the portable information processing device 10 as the attitude of the portable information processing device 10. That is, the attitude of the portable information processing device 10 is defined by the yaw orientation, pitch angle, and roll angle. These parameters are values in the global coordinate system.

In step S50, the control unit 16 records the current attitude as a reference attitude. In addition, the control unit 16 determines the current gravity vector as a reference gravity vector. In addition, the control unit 16 determines the current yaw orientation of the portable information processing device 10 as an estimated traveling orientation of the user. Further, the control unit 16 calculates the position, speed, and estimated traveling orientation of the user on the basis of the estimated traveling orientation, stride, and walking pitch of the user. Then, the control unit 16 determines them as positioning information (positioning information obtained by PDR). Thereafter, the control unit 16 terminates the initial attitude determination processing.

Figure 9:
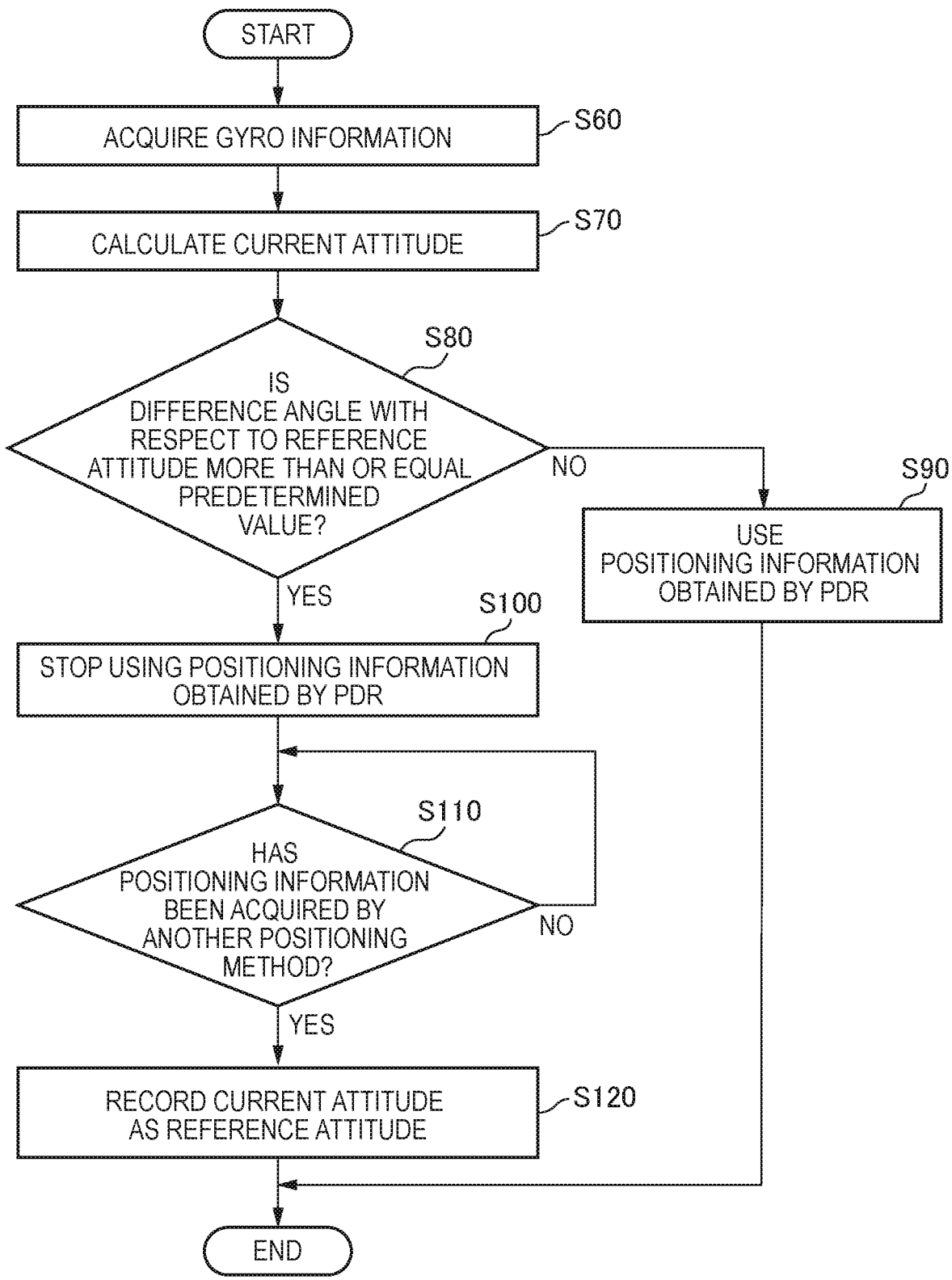
FIG. 9 is a flowchart showing an example of processing performed by the portable information processing device.

Then, the control unit 16 performs reliability determination processing shown in FIG. 9. Specifically, in step S60, the control unit 16 acquires gyro information from the sensing unit 11.

In step S70, the control unit 16 calculates the current attitude of the portable information processing device 10 on the basis of the gyro information and the attitude of the portable information processing device 10 calculated in previous reliability determination processing (initial attitude determination processing in the case where the reliability determination processing is performed for the first time). Note that the control unit 16 may calculate the current attitude of the portable information processing device 10 by performing processing similar to steps S10 to S40. However, the attitude can be calculated with higher accuracy in the case of using gyro information. Further, the control unit 16 determines the yaw orientation in the current attitude of the portable information processing device 10 as the current estimated traveling orientation. Then, the control unit 16 generates the current positioning information on the basis of the current estimated traveling orientation, number of steps, and stride. That is, the control unit 16 performs positioning by PDR in parallel with the reliability determination processing.

In step S80, the control unit 16 calculates a difference between the current attitude of the portable information processing device 10 and the reference attitude. Specifically, the control unit 16 calculates the current gravity vector on the basis of the current attitude of the portable information processing device 10. Then, on the basis of the inner product of the current gravity vector and the reference gravity vector, the control unit 16 calculates a difference angle between these gravity vectors. That is, the control unit 16 calculates a difference angle with respect to the reference attitude.

Then, the control unit 16 determines whether or not the difference angle with respect to the reference attitude is more than or equal to a predetermined value. In the case where it is determined that the difference angle is more than or equal to the predetermined value, the control unit 16 proceeds to step S100, and in the case where it is determined that the difference angle is less than the predetermined value, proceeds to step S90. Here, the predetermined value is not particularly restricted, but may be approximately 30 to 60°, and may be approximately 45°. Note that the attitude of the portable information processing device 10 varies while the user is walking, and in this case, it can be said that the orientation of the portable information processing device 10 and the actual traveling orientation of the user agree. By performing the processing of step S80, such an attitude change can be excluded from the factors for a decrease in reliability.

Here, the predetermined value may be set in a plurality of steps. In this case, the control unit 16 may proceed to step S90 until the difference angle becomes more than or equal to the maximum predetermined value. Then, in step S90, the control unit 16 may display the positioning information obtained by PDR in a display mode in accordance with the reliability.

In step S90, the control unit 16 determines that the reliability of the estimated traveling orientation obtained by PDR is high, and continually uses the positioning information obtained by PDR. For example, the control unit 16 displays the positioning information obtained by PDR on the display unit 14. Display examples will be described later. The control unit 16 may provide the positioning information for some application (for example, a map application) and the like. The control unit 16 can use the positioning information when executing an application. Thereafter, the control unit 16 terminates the reliability determination processing. Thereafter, the control unit 16 performs the reliability determination processing repeatedly.

In step S100, the control unit 16 determines that the reliability of the estimated traveling orientation obtained by PDR is low, and stops using the positioning information obtained by PDR. Consequently, in the case where an attitude change of the portable information processing device 10 is large, the control unit 16 determines that a displacement between the estimated traveling orientation of the user and the actual traveling orientation becomes large.

Here, the control unit 16 may display that the reliability of the estimated traveling orientation has decreased to the user. For example, the control unit 16 may stop displaying the positioning information. In addition, the control unit 16 may display that the display of the positioning information obtained by PDR is stopped. The control unit 16 may report the content to the user by sound. Specific display examples will be described later. In addition, the control unit 16 may provide the decrease in reliability of the estimated traveling orientation obtained by PDR for an application (for example, a map application) that uses the positioning information obtained by PDR. Accordingly, the application can use positioning information obtained by another positioning method instead of using the positioning information obtained by PDR.

In addition, the control unit 16 may continue using the positioning information obtained by PDR. In this case, the control unit 16 may change the display mode of the positioning information. Accordingly, the control unit 16 can report that the reliability of the estimated traveling orientation has decreased to the user. Specific display modes will be described later.

In step S110, the control unit 16 attempts to acquire positioning information by another positioning method (for example, a method of using GPS, a method of using Wifi, or the like). The control unit 16 performs the processing of S110 repeatedly until positioning information can be acquired by the other positioning method, and in the case where the positioning information can be acquired, proceeds to step S120. Note that, in the case where positioning information cannot be acquired by the other positioning method, the control unit 16 may terminate the reliability determination processing.

In step S120, the control unit 16 determines a yaw direction obtained by the other positioning method as the estimated traveling orientation of the user. Further, the control unit 16 specifies the current attitude by replacing the yaw orientation in the current attitude of the portable information processing device 10 with the estimated traveling orientation. Then, the control unit 16 determines the current attitude as the reference attitude. In addition, the current gravity vector is determined as the reference gravity vector. Thereafter, the control unit 16 terminates the present processing. Thereafter, the control unit 16 performs the reliability determination processing repeatedly. Consequently, in the case where the reliability of the estimated traveling orientation obtained by PDR has decreased, the control unit 16 acquires positioning information using another positioning method. Then, the control unit 16 specifies the estimated traveling orientation of the user using this positioning information. Further, the control unit 16 specifies the current attitude of the portable information processing device 10 using this estimated traveling orientation, and determines this as the reference attitude. That is, the reference attitude is updated. Thereafter, the control unit 16 performs the reliability determination processing repeatedly. Consequently, in the case where a difference angle between the current attitude of the portable information processing device 10 and the reference attitude returns to be less than the predetermined value, the control unit 16 restarts positioning by PDR.

Here, on the basis of FIG. 14 to FIG. 19, display examples will be described. Of course, the display examples are not limited to the following examples. In the display example shown in FIG. 14, the control unit 16 displays a current position marker A indicating the current position of the user and a movement trajectory 300. This movement trajectory 300 is obtained from positioning information obtained by PDR. Note that an actual movement trajectory 200 of the user is shown together in FIG. 14 and the like. In this display example, in the case where it is determined that the reliability of the estimated traveling orientation obtained by PDR has decreased, the control unit 16 stops displaying the movement trajectory 300. The movement trajectory 300 is displayed in the case where the reliability of the estimated traveling orientation obtained by PDR is high. In addition, the control unit 16 fixes the position of the current position marker A. Accordingly, the control unit 16 can report to the user that the reliability of the estimated traveling orientation obtained by PDR has decreased and that positioning by PDR has been stopped. The current position marker A may be deleted.

Figure 15:
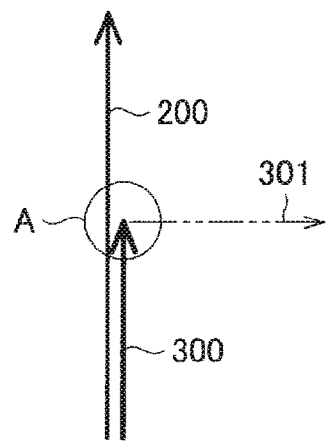
FIG. 15 is an explanatory diagram describing an example of an image displayed on a display unit of the portable information processing device.

In the display example shown in FIG. 15, the control unit 16 continues using the positioning information obtained by PDR even after the reliability has decreased. However, the control unit 16 displays a movement trajectory 301 after the reliability has decreased in a display mode different from the movement trajectory 300 before the reliability decreases (for example, in a different color, thickness, flashing mode, or the like). FIG. 15 expresses that the display mode is different by the thickness of line and line type. Accordingly, the control unit 16 can report to the user that the reliability of the estimated traveling orientation obtained by PDR has decreased.

Figure 16:
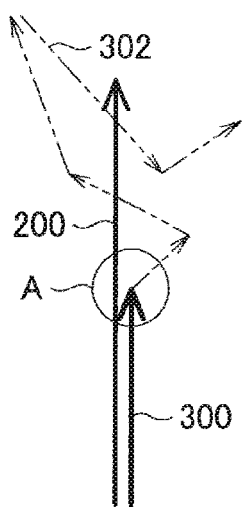
FIG. 16 is an explanatory diagram describing an example of an image displayed on a display unit of the portable information processing device.

In the display example shown in FIG. 16, the control unit 16 displays a movement trajectory 302 acquired by another positioning method after the reliability has decreased. In this example, the other positioning method is a method through use of GPS. The display mode of the movement trajectory 302 is different from the display mode of the movement trajectory 300. For example, the color, thickness, or the like is different. FIG. 16 expresses that the display mode is different by the thickness of line and line type. By this display example as well, the control unit 16 can report to the user that the reliability of the estimated traveling orientation obtained by PDR has decreased and that the positioning method has been changed. Note that, in FIG. 16, the state in which the difference angle is large is maintained even after the positioning method has been changed (progress is made from step S80 to step S100). Of course, even if the difference angle with respect to the reference attitude is less than the predetermined value, the movement trajectory 302 acquired by another positioning method may be displayed as shown in FIG. 16. In this case, the positioning performed by PDR may be restarted at any timing (for example, timing at which positioning by the other positioning method is disabled).

Figure 17:
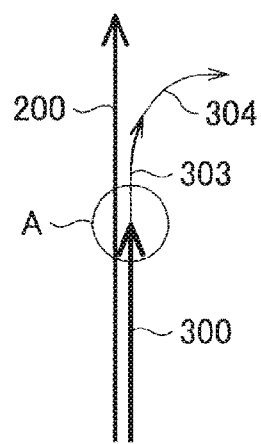
FIG. 17 is an explanatory diagram describing an example of an image displayed on a display unit of the portable information processing device.
Figure 18:
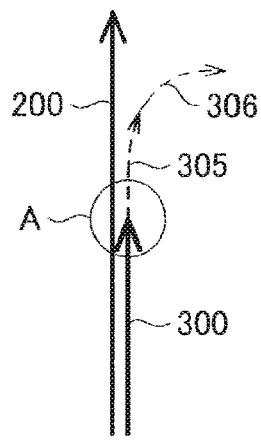
FIG. 18 is an explanatory diagram describing an example of an image displayed on a display unit of the portable information processing device.
Figure 19:
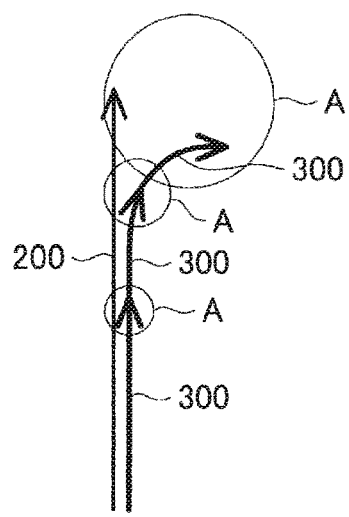
FIG. 19 is an explanatory diagram describing an example of an image displayed on a display unit of the portable information processing device.

Display examples of FIG. 17 to FIG. 19 are display examples in the case where the predetermined value is set step by step. In the display example of FIG. 17, the predetermined value is set in two steps (a first predetermined value<a second predetermined value). The first predetermined value may be approximately 20°, for example, and the second predetermined value may be approximately 45°. The control unit 16 displays the movement trajectory 300 in the case where a difference angle between the current attitude of the portable information processing device 10 and the reference attitude is less than the first predetermined value. In this case, the reliability of the estimated traveling orientation obtained by PDR is high. The control unit 16 displays a movement trajectory 303 in the case where the difference angle becomes more than or equal to the first predetermined value and less than the second predetermined value. The movement trajectory 303 is displayed in a color different from the movement trajectory 300. FIG. 17 expresses the difference in color by the thickness of line. In this case, the reliability of the estimated traveling orientation obtained by PDR slightly decreases. Consequently, a displacement from the actual movement trajectory 200 slightly occurs. The control unit 16 displays a movement trajectory 304 in the case where the difference angle becomes more than or equal to the second predetermined value. The movement trajectory 304 is displayed in a color different from the movement trajectories 300 and 303. FIG. 17 expresses the difference in color by the thickness of line. In this case, the reliability of the estimated traveling orientation obtained by PDR significantly decreases. Consequently, a displacement from the actual movement trajectory 200 becomes large.

FIG. 18 and FIG. 19 are display examples obtained by changing the display mode of FIG. 17. That is, in the display example shown in FIG. 18, the control unit 16 displays a movement trajectory 305 in the case where the difference angle becomes more than or equal to the first predetermined value. The movement trajectory 305 is displayed at a density different from the movement trajectory 300. FIG. 18 expresses the difference in density by the line type. The control unit 16 displays a movement trajectory 306 in the case where the difference angle becomes more than or equal to the second predetermined value. The movement trajectory 306 is displayed at a density different from the movement trajectories 300 and 305. FIG. 18 expresses the difference in density by the line type.

In the display example shown in FIG. 19, the control unit 16 displays the current position marker A enlargedly in the case where the difference angle becomes more than or equal to the first predetermined value. The control unit 16 displays the current position marker A further enlargedly in the case where the difference angle becomes more than or equal to the second predetermined value.

In any of the display examples, the control unit 16 can report to the user that the reliability of the estimated traveling orientation obtained by PDR is varying step by step. Note that, in FIG. 17 to FIG. 19, the display may be made in the case where positioning information by another positioning method cannot be acquired.

(4-2. Exemplary Processing 2)

Next, exemplary processing 2 performed by the portable information processing device 10 will be described on the basis of FIG. 10. In this exemplary processing 2, the portable information processing device 10 calculates the ratio between an estimated traveling orientation obtained by PDR and an estimated traveling orientation obtained by another positioning method on the basis of the reliability of the estimated traveling orientation obtained by PDR. Then, the portable information processing device 10 calculates the estimated traveling orientation of the user on the basis of the ratio.

In the exemplary processing 2, the control unit 16 performs initial attitude determination processing similar to the exemplary processing 1. Thereafter, the control unit 16 performs reliability determination processing shown in FIG. 10.

First, in steps S130 to S160 and S185 to S200, the control unit 16 performs processing similar to steps S60 to 80 and S100 to S120 shown in FIG. 9.

In step S170, the control unit 16 calculates the ratio between the estimated traveling orientation obtained by PDR and the estimated traveling orientation obtained by another positioning method on the basis of the difference angle between the current attitude of the portable information processing device 10 and the reference attitude. Here, since a displacement between the estimated traveling orientation obtained by PDR and the actual traveling orientation increases as the difference angle is larger, the difference angle is equivalent to the reliability of the estimated traveling orientation obtained by PDR. The control unit 16 may decrease the ratio of PDR as the difference angle is larger. For example, the control unit 16 may calculate the ratio of PDR on the basis of Expression (1) below.

$$a=(90-b)/90 \qquad (1)$$

Here, a is the ratio of PDR, and b is the difference angle. Note that, in the case where positioning by another positioning method cannot be performed, a may be 1.

In step S180, the control unit 16 calculates the estimated traveling orientation of the user on the basis of the ratio. For example, the control unit 16 may calculate the estimated traveling orientation of the user on the basis of Expression (2) below. Another type of positioning information can also be calculated similarly.

$$c=d(1-a)+e \times a \qquad (2)$$

Here, a is the ratio of PDR, c is the estimated traveling orientation of the user, d is the estimated traveling orientation obtained by another positioning method, and e is the estimated traveling orientation obtained by PDR. The control unit 16 further displays the estimated traveling orientation in a display mode in accordance with the ratio. Specific display examples will be described later. Thereafter, the control unit 16 terminates the reliability determination processing. Thereafter, the control unit 16 performs the reliability determination processing repeatedly.

Next, display examples in accordance with the exemplary processing 2 will be described on the basis of FIG. 20 to FIG. 22. In the display example of FIG. 20, the display mode is changed in three steps in accordance with the ratio. Of course, the steps of the display mode are not limited to this example. Specifically, the control unit 16 sets the first predetermined value and the second predetermined value (the first predetermined value <the second predetermined value) in terms of the ratio similarly to the case where the predetermined value to be compared with the difference angle is set step by step. Then, display modes in accordance with three patterns in which: the ratio≥the second predetermined value; the second predetermined value>the ratio≥the first predetermined value; and the first predetermined value>the ratio are set. The first predetermined value may be 0.5 (equivalent to the difference) angle=45°, for example, and the second predetermined value may be 0.78 (equivalent to the difference)angle=20°, for example.

The control unit 16 displays the movement trajectory 300 in the case where the ratio of PDR becomes more than or equal to the second predetermined value. In this case, the reliability of the estimated traveling orientation obtained by PDR is high, and the ratio of PDR is the highest. The control unit 16 displays a movement trajectory 310 in the case where the ratio becomes less than the second predetermined value and more than or equal to the first predetermined value. The movement trajectory 310 is displayed in a color different from the movement trajectory 300. FIG. 20 expresses the difference in color by the thickness of line. In this case, since the reliability of the estimated traveling orientation obtained by PDR slightly decreases, the ratio of PDR slightly decreases. The control unit 16 displays a movement trajectory 320 in the case where the ratio becomes less than the first predetermined value. The movement trajectory 320 is displayed in a color different from the movement trajectories 300 and 310. FIG. 20 expresses the difference in color by the thickness of line. In this case, since the reliability of the estimated traveling orientation obtained by PDR significantly decreases, the ratio of PDR also decreases significantly.

Figure 20:
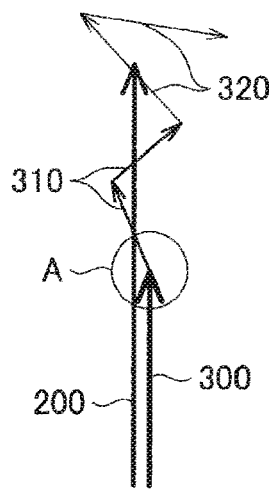
FIG. 20 is an explanatory diagram describing an example of an image displayed on a display unit of the portable information processing device.
Figure 21:
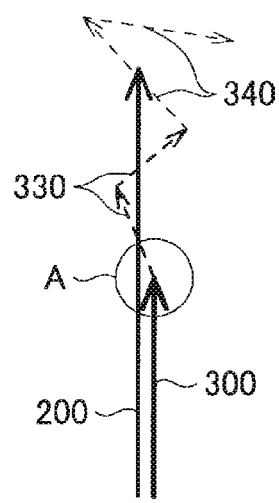
FIG. 21 is an explanatory diagram describing an example of an image displayed on a display unit of the portable information processing device.
Figure 22:
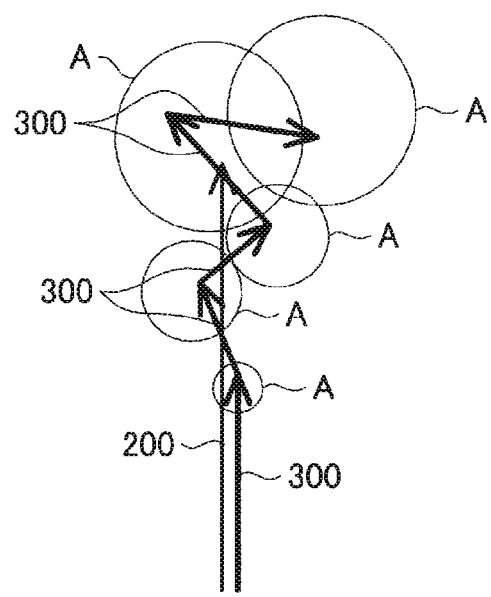
FIG. 22 is an explanatory diagram describing an example of an image displayed on a display unit of the portable information processing device.

FIG. 21 and FIG. 22 are display examples obtained by changing the display mode of FIG. 20. That is, in the display example shown in FIG. 21, the control unit 16 displays a movement trajectory 330 in the case where the ratio becomes less than the second predetermined value and more than or equal to the first predetermined value. The movement trajectory 330 is displayed at a density different from the movement trajectory 300. FIG. 21 expresses the difference in density by the line type. The control unit 16 displays a movement trajectory 340 in the case where the ratio becomes less than the first predetermined value. The movement trajectory 340 is displayed at a density different from the movement trajectories 300 and 330. FIG. 21 expresses the difference in density by the line type.

In the display example shown in FIG. 22, the control unit 16 displays the current position marker A enlargedly in the case where the ratio becomes less than the second predetermined value and more than or equal to the first predetermined value. The control unit 16 displays the current position marker A further enlargedly in the case where the ratio becomes less than the first predetermined value.

In any of the display examples, the control unit 16 can report to the user that the reliability of the estimated traveling orientation obtained by PDR is varying step by step.

(4-3. Exemplary Processing 3)

Figure 11:
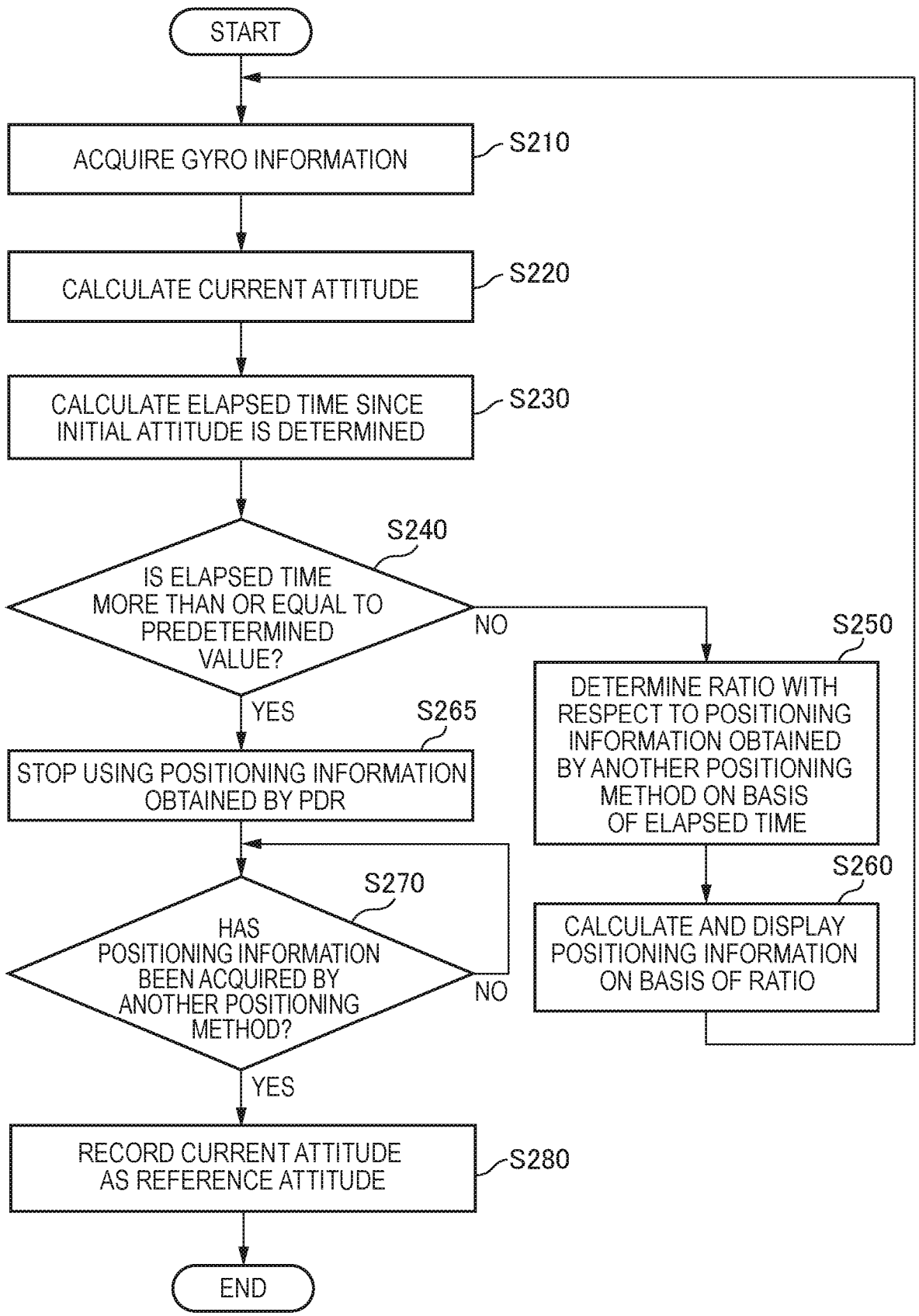
FIG. 11 is a flowchart showing an example of processing performed by the portable information processing device.

Next, exemplary processing 3 performed by the portable information processing device 10 will be described on the basis of FIG. 11. In this exemplary processing 3, the portable information processing device 10 determines the reliability of the estimated traveling orientation obtained by PDR on the basis of an elapsed time since an initial attitude is determined. That is, in PDR, as the elapsed time since the initial attitude is determined is longer, a displacement between the estimated traveling orientation of the user and the actual traveling orientation tends to be larger. Thus, in the exemplary processing 3, the portable information processing device 10 determines that the reliability of the estimated traveling orientation obtained by PDR decreases in the case where the elapsed time is long.

In the exemplary processing 3, the control unit 16 performs initial attitude determination processing similar to the exemplary processing 1. Thereafter, the control unit 16 performs the reliability determination processing shown in FIG. 11.

First, in steps S210 to S220, the control unit 16 performs processing similar to steps S60 to 70 shown in FIG. 9.

In step S230, the control unit 16 calculates the elapsed time since the time point of termination of the initial attitude determination processing. Note that this elapsed time may be an elapsed time since the above-described difference angle becomes more than or equal to the predetermined value.

In step S240, the control unit 16 determines whether or not the elapsed time is more than or equal to the predetermined value. The control unit 16 proceeds to step S265 in the case where it is determined that the elapsed time is more than or equal to the predetermined value, and proceeds to step S250 in the case where it is determined that the elapsed time is less than the predetermined value. Here, the predetermined value is not particularly restricted, but may be approximately 400 to 600 seconds, and may be approximately 500 seconds.

Figure 10:
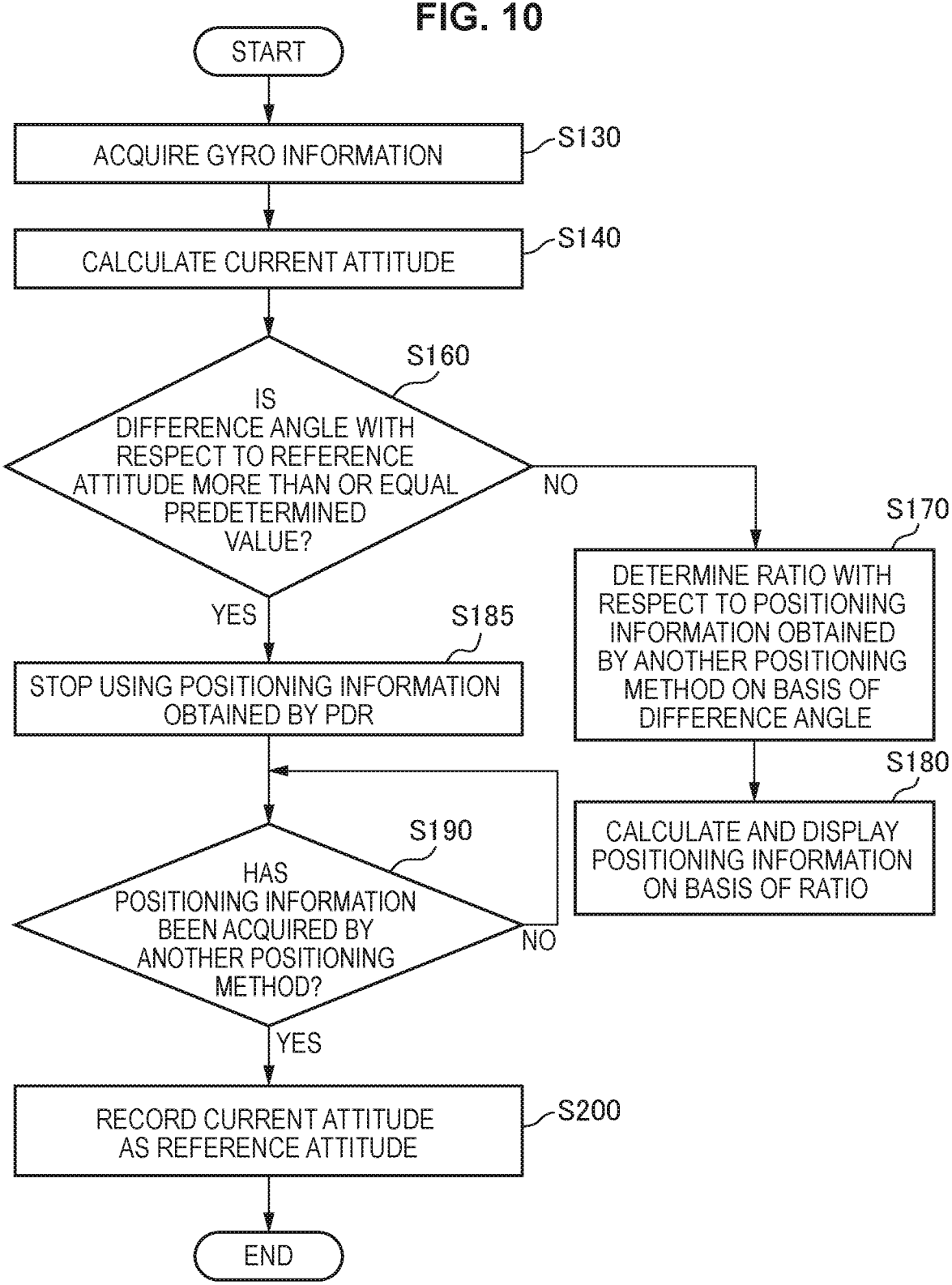
FIG. 10 is a flowchart showing an example of processing performed by the portable information processing device.

In step S250 to S260, the control unit 16 performs processing similar to steps S170 to S180 shown in FIG. 10. However, the control unit 16 calculates the ratio on the basis of the elapsed time. For example, the control unit 16 may calculate the ratio on the basis of Expression (3) below.

$$f=(g-h)/g \qquad (3)$$

Here, f is the ratio of PDR, g is the predetermined value used in step S240, and h is the elapsed time. Thereafter, the control unit 16 terminates the reliability determination processing. Thereafter, the control unit 16 performs the reliability determination processing repeatedly.

On the other hand, in steps S265 to S280, the control unit 16 performs processing similar to steps S100 to S120 shown in FIG. 9. Thereafter, the control unit 16 terminates the reliability determination processing. Thereafter, the control unit 16 performs the reliability determination processing repeatedly. Note that the control unit 16 may perform processing similar to step S90 instead of the processing of steps S250 to S260. In this case, the predetermined value may be set step by step.

Display examples of the exemplary processing 3 are similar to the exemplary processing 1 to exemplary processing 2. For example, in the case where the predetermined value is set step by step, the control unit 16 can display images similar to FIG. 17 to FIG. 19. In this case, the first predetermined value may be, for example, approximately 100 seconds, and the second predetermined value may be approximately 500 seconds.

In addition, in the case where the estimated traveling orientation is calculated in accordance with the ratio, the control unit 16 can display images similar to FIG. 20 to FIG. 22. In this case, the display mode is changed in three steps in accordance with the ratio. Specifically, the control unit 16 sets the first predetermined value and the second predetermined value (the first predetermined value<the second predetermined value) in terms of the ratio. Then, display modes in accordance with three patterns in which: the ratio≥the second predetermined value; the second predetermined value>the ratio≥the first predetermined value; and the first predetermined value>the ratio are set. The first predetermined value may be 0.1 (equivalent to g=500 seconds, and the elapsed time=450 seconds), for example, and the second predetermined value may be 0.8 (equivalent to g=500 seconds, and the elapsed time =100 seconds), for example.

(4-4. Exemplary Processing 4)

Next, exemplary processing 4 performed by the portable information processing device 10 will be described on the basis of FIG. 12 to FIG. 13. In the exemplary processing 1 to the exemplary processing 3, an attitude change of the portable information processing device 10 is detected, and on the basis of the attitude change, the reliability of the estimated traveling orientation obtained by PDR is determined. That is, in the exemplary processing 1 to the exemplary processing 3, a change in orientation of the portable information processing device 10 accompanied by an attitude change of the portable information processing device 10 is detected, and in the case where the amount of change exceeds a predetermined value, it is determined that the reliability has decreased. However, in the use modes shown in FIG. 3 to FIG. 5, the orientation of the portable information processing device 10 changes without being accompanied by an attitude change of the portable information processing device 10. Note that the yaw orientation of the portable information processing device 10 varies in FIG. 3, but the variation in yaw orientation does not affect a gravity vector (that is, cannot be sensed by the sensing unit 11). Consequently, changes in orientation of the portable information processing device 10 occurred in the use modes of FIG. 3 to FIG. 5 cannot be detected in the exemplary processing 1 to the exemplary processing 3. Thus, in the exemplary processing 4, such an orientation change is detected to evaluate the reliability.

Figure 12:
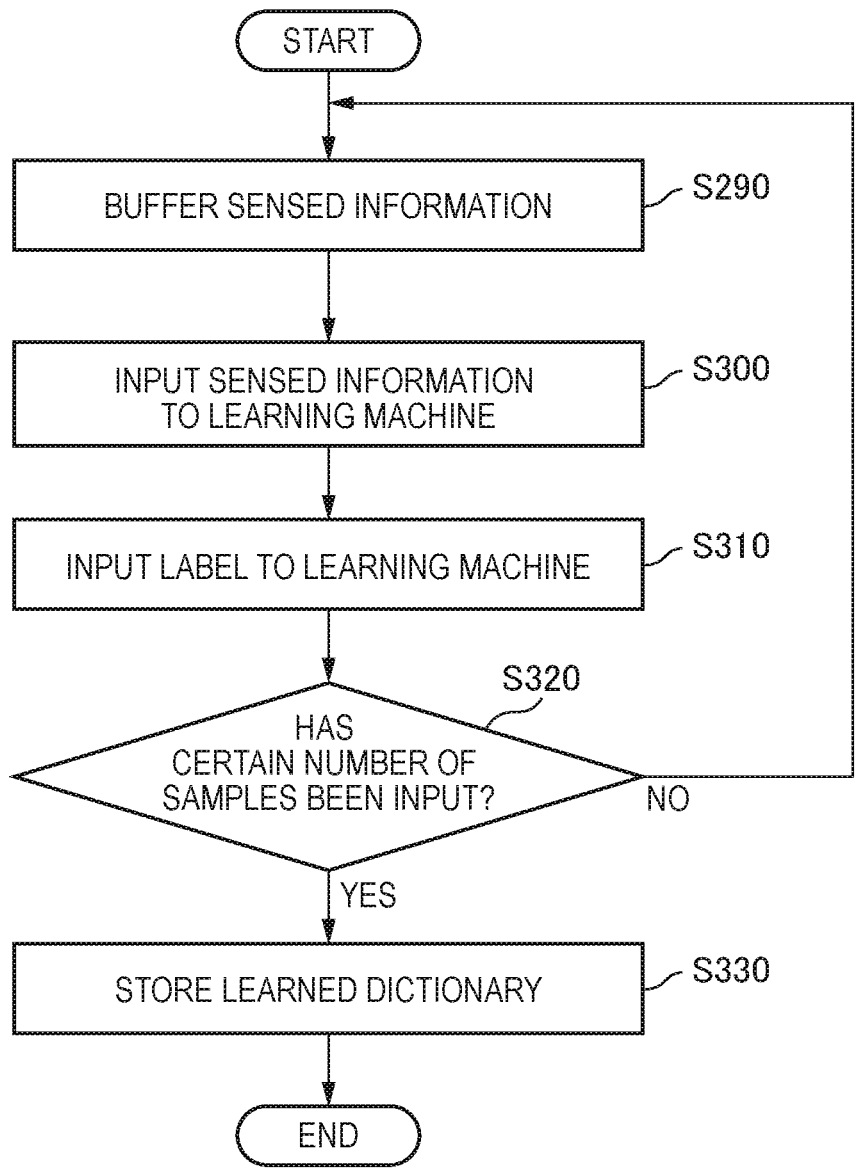
FIG. 12 is a flowchart showing an example of processing performed by the portable information processing device.

The portable information processing device 10 first performs learning processing shown in FIG. 12 to create a learned dictionary (learning data). Specifically, in step S290, a worker (for example, a designer of the portable information processing device 10, or the like) who causes a learning machine to perform learning uses the portable information processing device 10 in the use modes shown in FIG. 3 to FIG. 5. That is, the worker uses the portable information processing device 10 in a use mode of at least one or more kinds of a rotation within the horizontal plane, a lateral movement, and a backward movement of the portable information processing device 10.

Accordingly, the sensing unit 11 outputs various types of sensed information to the control unit 16. The control unit 16 buffers these types of sensed information. The sensed information can include acceleration information, gyro information, geomagnetic information, and the like. These may all be buffered, or any one or more kinds may be buffered. As the types of sensed information to be buffered increase, the accuracy improves.

In step S300, the control unit 16 inputs the buffered sensed information to the learning machine. Here, the learning machine may be built in the portable information processing device 10, or may be built in another information processing device. In the case where the learning machine is built in another information processing device, the portable information processing device 10 and the other information processing device may be connected via the interface unit 15. Alternatively, the portable information processing device 10 and another information processing device may perform communication via the communication unit 12.

In step S310, the worker adds a label to the sensed information input to the learning machine. That is, the worker associates the sensed information and the label. Here, the label includes the following two types, for example.

Label 1: a rotation of the portable information processing device 10 within the horizontal plane Label 2: a movement in a direction other than frontforward Consequently, a lateral movement and a backward movement are not distinguished in the exemplary processing 4, but they may be labelled for distinction. In addition, a use mode (such as rotating the portable information processing device 10 within the horizontal plane while making a lateral movement, for example) with the labels 1+2 may also be labelled separately.

In step S320, the worker determines whether or not input of a certain number of samples has been terminated, and in the case where input has been terminated, proceeds to step S330, and in the case where input has not been terminated, returns to step S290. Note that the number of samples here is not particularly restricted, but may be set in accordance with the accuracy required for the portable information processing device 10, or the like. As the number of samples is larger, the accuracy can be higher.

In step S330, the worker causes the portable information processing device 10 to store information stored in the learning machine, that is, a learned dictionary. In the learned dictionary, the sensed information and a label are registered in association. From the foregoing, the learning processing is terminated.

Figure 13:
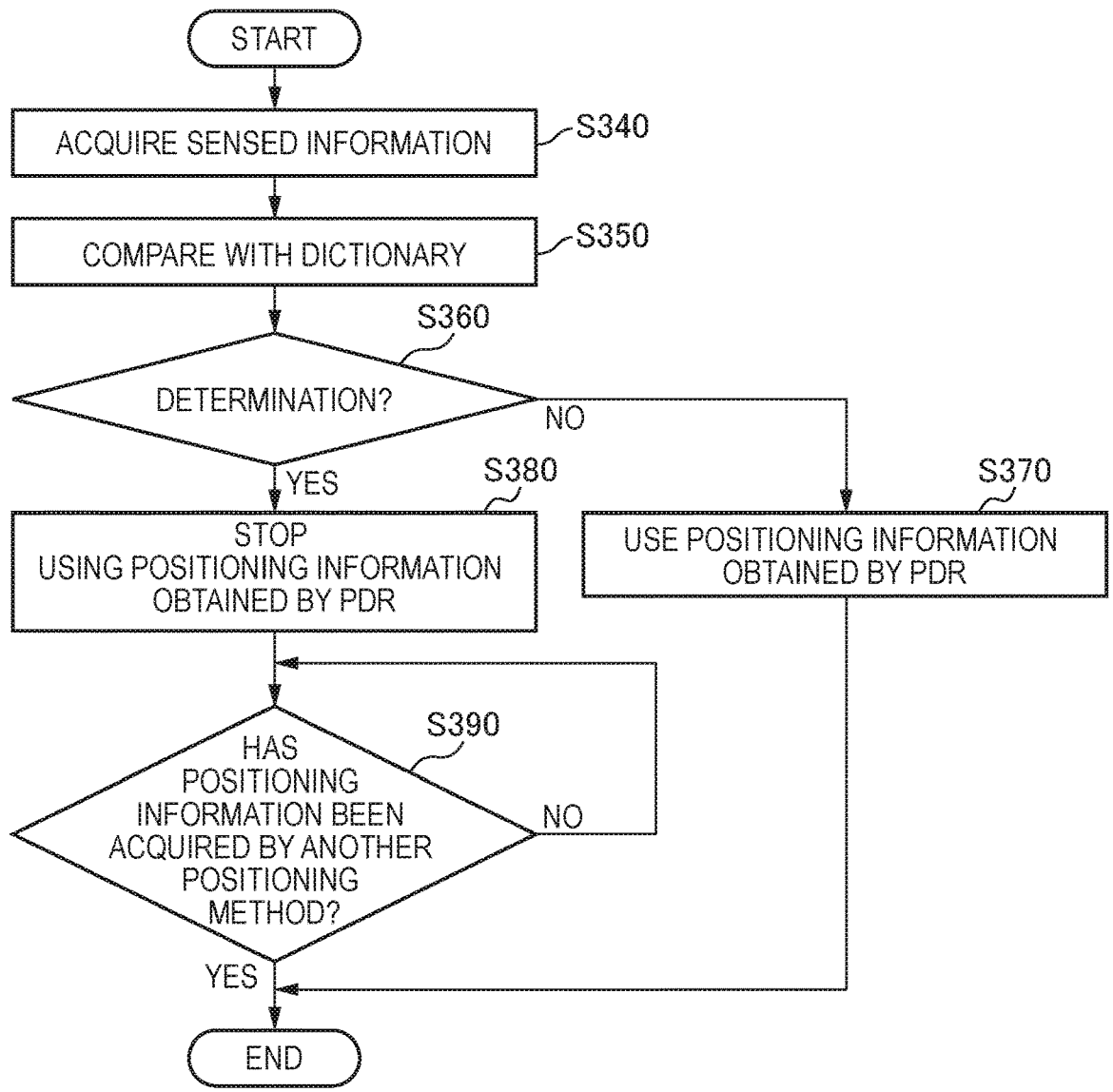
FIG. 13 is a flowchart showing an example of processing performed by the portable information processing device.
Figure 14:
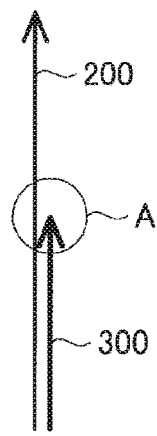
FIG. 14 is an explanatory diagram describing an example of an image displayed on a display unit of the portable information processing device.

Next, the control unit 16 performs the reliability determination processing shown in FIG. 13. Note that the control unit 16 performs positioning by PDR in parallel to the reliability determination processing. That is, the control unit 16 specifies the initial orientation of the portable information processing device 10. Then, the control unit 16 calculates the amount of variation in the yaw orientation on the basis of sensed information (for example, gyro information) output from the sensing unit 11. Accordingly, the current yaw orientation of the portable information processing device 10 is specified. Then, the orientation of the portable information processing device 10 is determined as the estimated traveling orientation of the user.

In step S340, the control unit 16 acquires sensed information from the sensing unit 11. Then, in step S350, the control unit 16 compares the acquired sensed information and the learned dictionary.

In step S360, the control unit 16 determines whether or not a label corresponding to the acquired sensed information exists. In the case where it is determined that a label corresponding to the acquired sensed information exists, the control unit 16 proceeds to step S380. On the other hand, in the case where it is determined that the label does not exist, the control unit 16 proceeds to step S370.

In steps S380 and S390, the control unit 16 performs processing similar to steps S100 to S110 shown in FIG. 9. Thereafter, the control unit 16 terminates the reliability determination processing. Thereafter, the control unit 16 performs the reliability determination processing repeatedly.

In step S370, the control unit 16 performs processing similar to step S90 shown in FIG. 9. Thereafter, the control unit 16 terminates the reliability determination processing. Thereafter, the control unit 16 performs the reliability determination processing repeatedly. According to the exemplary processing 4, the control unit 16 can report to the user that the reliability of the estimated traveling orientation has decreased even in the case where the user uses the portable information processing device 10 in the use modes shown in FIG. 3 to FIG. 5. Note that, also in the exemplary processing 4, the ratio may be calculated similarly to the exemplary processing 2 and the exemplary processing 3, and on the basis of this ratio, the estimated traveling orientation may be calculated. In the exemplary processing 4, however, since a displacement occurs in the yaw orientation that imposes the greatest influence on the position accuracy, it is preferable to stop using the positioning information obtained by PDR in the case where the reliability has decreased, as in the present flowchart. In addition, the exemplary processing 1 to the exemplary processing 4 may be combined in any manner. For example, in any of the case where the exemplary processing 1 and the exemplary processing 4 are combined, the case where the user shifts the portable information processing device 10, and the case where a lateral movement or the like is made, the control unit 16 can determine that the reliability of the estimated traveling orientation obtained by PDR has decreased.

From the foregoing, according to the present embodiment, the control unit 16 calculates the estimated traveling orientation of the user on the basis of sensed information output from the sensing unit 11 built in the portable information processing device 10. That is, the control unit 16 calculates the estimated traveling orientation of the user using PDR. Then, the control unit 16 determines the reliability of the estimated traveling orientation obtained by PDR.

In addition, the control unit 16 calculates an attitude change of the portable information processing device 10 on the basis of the sensed information, and determines the reliability on the basis of the attitude change of the portable information processing device 10. Consequently, the control unit 16 can determine a decrease in reliability in the case where the user uses the portable information processing device 10 in the use mode (so-called shifting) shown in FIG. 1 and FIG. 2, for example.

In addition, since the control unit 16 determines the reliability of the estimated traveling orientation obtained by PDR on the basis of a difference between the current attitude of the portable information processing device 10 and a predetermined reference attitude, the reliability can be determined with higher accuracy.

In addition, since the control unit 16 determines that the reliability of the estimated traveling orientation obtained by PDR has decreased in the case where the difference between the current attitude of the portable information processing device 10 and the reference attitude becomes more than or equal to the predetermined value, the reliability can be determined with higher accuracy.

In addition, since the control unit 16 sets the predetermined value step by step, the reliability can be determined with higher accuracy.

In addition, since the control unit 16 sets the reference attitude on the basis of the sensed information, the reliability can be determined with higher accuracy.

In addition, the control unit 16 sets the initial attitude of the portable information processing device on the basis of the sensed information, and as the elapsed time since the initial attitude is set is longer, determines that the amount of decrease in reliability is larger. Positioning performed by PDR tends to be decreased in reliability as the elapsed time since the starting point of positioning is longer. According to the present embodiment, such a decrease in reliability can also be detected.

In addition, the control unit 16 determines the reliability of the estimated traveling orientation obtained by PDR on the basis of learning data in which the sensed information and the use mode of the portable information processing device 10 are associated. Consequently, in the case where the user uses the portable information processing device 10 in a use mode registered in the learning data, the control unit 16 can determine a decrease in reliability.

In addition, the control unit 16 determines whether or not the use mode of the portable information processing device 10 by the user agrees with the use mode registered in the learning data on the basis of the sensed information. Then, in the case where it is determined that the use mode of the portable information processing device 10 by the user agrees with the use mode registered in the learning data, the control unit 16 determines that the reliability has decreased. Consequently, the control unit 16 can determine the reliability with higher accuracy.

In addition, any one or more kinds selected from the group consisting of a rotation of the portable information processing device 10 within the horizontal plane, a user's lateral movement, and a backward movement are included in the use mode registered in the learning data. Consequently, in the case where the user uses the portable information processing device 10 in the use modes shown in FIG. 3 to FIG. 5 (a rotation within the horizontal plane, lateral movement, backward movement), for example, the control unit 16 can determine a decrease in reliability.

In addition, in the case where it is determined that the reliability of the estimated traveling orientation obtained by PDR has decreased, the control unit 16 exerts control of presenting that the reliability has decreased to the user. The presentation is performed by, for example, image display, sound output, or the like. Accordingly, the user can easily understand that the reliability of the estimated traveling orientation obtained by PDR has decreased.

In addition, since the control unit 16 exerts control of presenting the estimated traveling orientation of the user in a presentation mode in accordance with the reliability, the user can easily understand to what degree the reliability has decreased.

In addition, the control unit 16 calculates the estimated traveling orientation of the user on the basis of the sensed information, and in the case where the reliability has decreased, calculates the estimated traveling orientation of the user by another positioning method. Consequently, even in the case where the reliability of the estimated traveling orientation obtained by PDR has decreased, the control unit 16 can present an estimated traveling orientation of stabler accuracy to the user.

In addition, in the case where the estimated traveling orientation of the user can be calculated by the other positioning method, the control unit 16 restarts calculation of the estimated traveling orientation of the user based on the sensed information. Accordingly, the control unit 16 can perform positioning by PDR more correctly.

In addition, the control unit 16 determines the ratio between the estimated traveling orientation obtained by PDR and the estimated traveling orientation obtained by the other positioning method on the basis of the reliability. Then, the control unit 16 calculates the estimated traveling orientation of the user on the basis of the ratio. Consequently, the control unit 16 can present an estimated traveling orientation of stabler accuracy to the user.

In addition, since the control unit 16 decreases the ratio of the estimated traveling orientation obtained by PDR as the reliability is lower, the control unit 16 can present an estimated traveling orientation of stabler accuracy to the user.

In addition, since the control unit 16 exerts control of presenting the estimated traveling orientation of the user in a presentation mode in accordance with the ratio, the user can easily understand the current reliability of PDR.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the above-described embodiment assumes that the portable information processing device 10 performs the whole processing according to the present embodiment, but the present technology is not limited to such an example. For example, part of the processing according to the present embodiment, for example, positioning performed by PDR, evaluation of reliability, learning through use of a learning machine, and the like, may be performed by another information processing device.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including: a control unit configured to determine reliability of positioning information of a user calculated on a basis of sensed information output from a sensing unit built in a portable information processing device.

(2)

The information processing device according to (1), in which the control unit calculates an attitude change of the portable information processing device on a basis of the sensed information, and determines the reliability on a basis of the attitude change of the portable information processing device.

(3)

The information processing device according to (2), in which the control unit determines the reliability on a basis of a difference between a current attitude of the portable information processing device and a predetermined reference attitude.

(4)

The information processing device according to (3), in which the control unit determines that the reliability has decreased in a case where the difference between the current attitude of the portable information processing device and the reference attitude becomes more than or equal to a predetermined value.

(5)

The information processing device according to (4), in which the control unit sets the predetermined value step by step.

(6)

The information processing device according to any one of (3) to (5), in which the control unit sets the reference attitude on a basis of the sensed information.

(7)

The information processing device according to any one of (1) to (6), in which the control unit sets an initial attitude of the portable information processing device on a basis of the sensed information, and determines that an amount of decrease in the reliability is larger as an elapsed time since the initial attitude is set is longer.

(8)

The information processing device according to any one of (1) to (7), in which the control unit determines the reliability on a basis of learning data in which the sensed information and a use mode of the portable information processing device are associated.

(9)

The information processing device according to (8), in which the control unit determines whether or not a use mode of the portable information processing device by a user agrees with a use mode registered in the learning data on a basis of the sensed information, and in a case where it is determined that the use mode of the portable information processing device by the user agrees with the use mode registered in the learning data, determines that the reliability has decreased.

(10)

The information processing device according to (9), in which any one or more kinds selected from the group consisting of a rotation of the portable information processing device within a horizontal plane, a lateral movement of the user, and a backward movement are included in the use mode registered in the learning data.

(11)

The information processing device according to any one of (1) to (10), in which in a case where it is determined that the reliability has decreased, the control unit exerts control of presenting that the reliability has decreased to the user.

(12)

The information processing device according to any one of (1) to (11), in which the control unit exerts control of presenting positioning information of the user in a presentation mode in accordance with the reliability.

(13)

The information processing device according to any one of (1) to (12), in which the control unit calculates positioning information of the user on a basis of the sensed information, and in a case where the reliability has decreased, calculates positioning information of the user by another positioning method.

(14)

The information processing device according to (13), in which in a case where the positioning information of the user can be calculated by the other positioning method, the control unit restarts calculation of positioning information of the user based on the sensed information.

(15)

The information processing device according to any one of (1) to (14), in which on a basis of the reliability, the control unit determines a ratio between positioning information of the user calculated on a basis of the sensed information and positioning information of the user calculated by another positioning method, and on a basis of the ratio, calculates positioning information of the user.

(16)

The information processing device according to (15), in which the control unit decreases the ratio of the positioning information of the user calculated on the basis of the sensed information as the reliability is lower.

(17)

The information processing device according to (15) or (16), in which the control unit exerts control of presenting positioning information of the user in a presentation mode in accordance with the ratio.

(18)

The information processing device according to any one of (1) to (17), in which at least one or more kinds of an estimated traveling orientation, a speed, and a position of the user are included in the positioning information.

(19)

An information processing method including: determining, by a processor, reliability of positioning information of a user calculated on a basis of sensed information output from a sensing unit built in a portable information processing device.

(20)

A program causing a computer to achieve: a control function of determining reliability of positioning information of a user calculated on a basis of sensed information output from a sensing unit built in a portable information processing device.

REFERENCE SIGNS LIST

10 portable information processing device
11 sensing unit
12 communication unit
13 operation unit
14 display unit
15 interface unit
16 control unit

The invention claimed is:

1. An information processing device, comprising:
   at least one sensor configured to output sensor information associated with the information processing device; and
   a central processing unit (CPU) configured to:
      determine positioning information of a user based on the sensor information output from the at least one sensor;
      control a display panel to display the positioning information of the user;
      calculate a current attitude of the information processing device based on the sensor information;
      determine a current gravity vector based on the current attitude of the information processing device;
      calculate a difference angle between the current gravity vector and a reference gravity vector based on an inner product of the current gravity vector and the reference gravity vector;
      determine reliability of the positioning information of the user based on the difference angle;
      determine that the difference angle is one of more than a threshold value or equal to the threshold value;
      determine a change in the reliability of the positioning information based on the determination that the difference angle is one of more than the threshold value or equal to the threshold value; and
      control the display panel to change a display mode of the positioning information, wherein the display panel is controlled to change the display mode based on the change in the reliability of the positioning information.

2. The information processing device according to claim 1, wherein the CPU is further configured to:
   calculate an attitude change of the information processing device based on the sensor information; and
   determine the change in the reliability based on the attitude change of the information processing device.

3. The information processing device according to claim 2, wherein the CPU is further configured to determine the reliability based on a difference between the current attitude of the information processing device and a reference attitude.

4. The information processing device according to claim 3, wherein the CPU is further configured to determine a decrease in the reliability in a case where the difference between the current attitude and the reference attitude is one of more than the threshold value or equal to the threshold value.

5. The information processing device according to claim 4, wherein the CPU is further configured to set the threshold value step by step.

6. The information processing device according to claim 3, wherein the CPU is further configured to set the reference attitude based on the sensor information.

7. The information processing device according to claim 1, wherein the CPU is further configured to:
   set an initial attitude of the information processing device based on the sensor information; and
   determine that an amount of decrease in the reliability is larger as an elapsed time since the initial attitude is set increases.

8. The information processing device according to claim 1, wherein
   the CPU is further configured to determine the reliability based on learning data, and
   the learning data includes the sensor information associated with a use mode of the information processing device.

9. The information processing device according to claim 8, wherein the CPU is further configured to:
   determine, based on the sensor information, whether the use mode of the information processing device by the user agrees with the use mode in the learning data; and
   determine a decrease in the reliability based on the determination that the use mode of the information processing device by the user agrees with the use mode in the learning data.

10. The information processing device according to claim 9, wherein the use mode in the learning data comprises at least one of a rotation of the information processing device within a horizontal plane, a lateral movement of the user, or a backward movement of the user.

11. The information processing device according to claim 1, wherein the CPU is further configured to:
    determine a decrease in the reliability of the positioning information; and control the display panel to present specific information that indicates that the reliability has decreased to the user, wherein the display panel is controlled to present the specific information based on the determination that the reliability is decreased.

12. The information processing device according to claim 1, wherein the CPU is further configured to:
determine the positioning information by a first positioning information;
determine whether the reliability of the positioning information is decreased; and
calculate the positioning information of the user by a second positioning method based on the determination that the reliability is decreased.

13. The information processing device according to claim 12, wherein the CPU is further configured to restart the determination of the positioning information of the user in a case where the positioning information of the user is calculable by the second positioning method.

14. The information processing device according to claim 1, wherein
the positioning information of the user determined based on the sensor information is first positioning information, and
the CPU is further configured to:
calculate second positioning information based on a second positioning method;
determine a ratio between the first positioning information of the user and the second positioning information of the user based on the reliability; and
calculate third positioning information of the user based on the ratio.

15. The information processing device according to claim 14, wherein the CPU is further configured to decrease the ratio as the reliability decreases.

16. The information processing device according to claim 14, wherein CPU is further configured control, based on the ratio, the display panel to present the first positioning information of the user in a specific presentation mode.

17. The information processing device according to claim 1, wherein the positioning information includes at least one of an estimated traveling orientation of the user, a speed of the user, or a position of the user.

18. An information processing method, comprising:
outputting, by at least one sensor, sensor information associated with an information processing device;
determining, by a central processing unit (CPU), positioning information of a user based on the sensor information output from the at least one sensor;
controlling a display panel to display the positioning information of the user;
calculating, by the CPU, a current attitude of the information processing device based on the sensor information;
determining, by the CPU, a current gravity vector based on the current attitude of the information processing device;
calculating, by the CPU, a difference angle between the current gravity vector and a reference gravity vector based on an inner product of the current gravity vector and the reference gravity vector; determining, by the CPU, reliability of the positioning information of the user based on the difference angle;
determining, by the CPU, that the difference angle is one of more than a threshold value or equal to the threshold value;
determining, by the CPU, a change in the reliability of the positioning information based on the determination that the difference angle is one of more than the threshold value or equal to the threshold value; and
controlling, by the CPU, the display panel to change a display mode of the positioning information, wherein the display panel is controlled to change the display mode based on the change in the reliability of the positioning information.

19. A non-transitory computer-readable medium having stored thereon, computer-executable instructions which, when executed by a computer, cause the computer to execute operations, the operations comprising:
outputting, by at least one sensor, sensor information associated with an information processing device;
determining positioning information of a user based on the sensor information output from the at least one sensor;
controlling a display panel to display the positioning information of the user;
calculating a current attitude of the information processing device based on the sensor information;
determining a current gravity vector based on the current attitude of the information processing device;
calculating a difference angle between the current gravity vector and a reference gravity vector based on an inner product of the current gravity vector and the reference gravity vector;
determining reliability of the positioning information of the user based on the difference angle;
determining that the difference angle is one of more than a threshold value or equal to the threshold value;
determining a change in the reliability of the positioning information based on the determination that the difference angle is one of more than the threshold value or equal to the threshold value; and
controlling the display panel to change a display mode of the positioning information, wherein the display panel is controlled to change the display mode based on the change in the reliability of the positioning information.

* * * * *